E. F. KERKHOFF.
TRANSMISSION GEARING.
APPLICATION FILED JAN. 9, 1920.
1,359,387.
Patented Nov. 16, 1920.
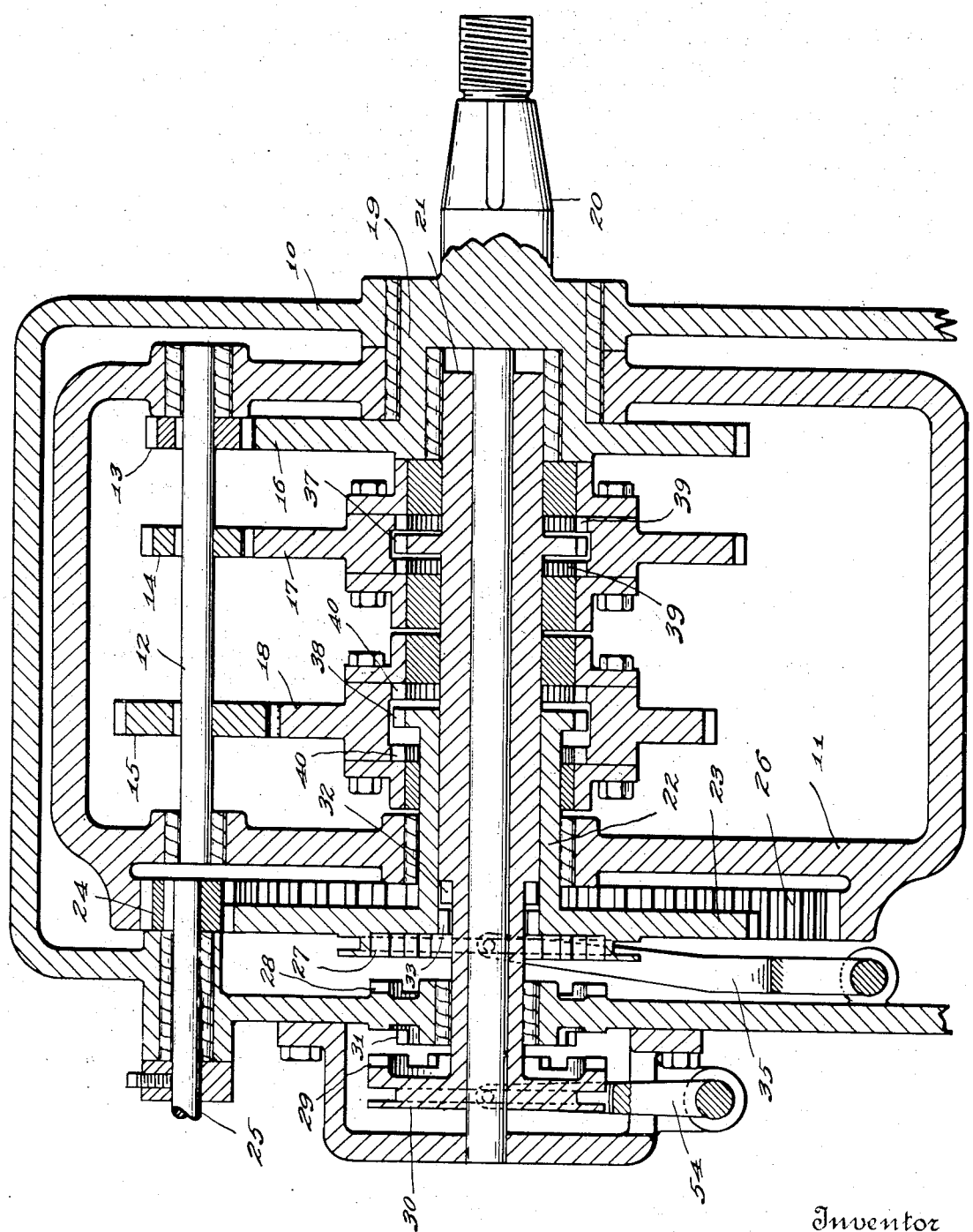
Inventor
Edward F. Kerkhoff,
By
Hood & Schley.
Attorneys

UNITED STATES PATENT OFFICE.

EDWARD F. KERKHOFF, OF INDIANAPOLIS, INDIANA.

TRANSMISSION-GEARING.

1,359,387.  Specification of Letters Patent.  Patented Nov. 16, 1920.

Application filed January 9, 1920. Serial No. 350,263.

*To all whom it may concern:*

Be it known that I, EDWARD F. KERKHOFF, a citizen of the United States, residing at Indianapolis, in the county of Marion and State of Indiana, have invented a new and useful Transmission-Gearing, of which the following is a specification.

It is the object of my invention to produce a transmission gearing having great speed reduction and operable to drive in either direction and with a plurality of speeds. The gearing shown produces three speeds in one direction and one in the reverse direction.

The accompanying drawing illustrates my invention. The single figure of such drawing is a central longitudinal section through a gearing embodying my invention.

In a stationary housing 10 is rotatably mounted a cage 11, which carries any desired number of planetary shafts 12, only one such shaft being shown. Fixed on each shaft 12 are three pinions 13, 14, and 15, of successively larger diameters, the pinion 14 being only slightly larger than the pinion 13. The pinions 13, 14 and 15 mesh respectively with gears 16, 17, and 18, of successively smaller size, these three gears all being co-axial with the cage 11. The gear 16 is provided with a trunnion bearing portion 19 supported on suitable roller bearings in the frame 10 and cage 11, thus forming the support for one end of the cage; and extends through the frame 10 and terminates in a shaft 20, which is the driven shaft when the device is used as a speed-reducing gearing. The gear 16 also has a roller-bearing mounting on a co-axial, longitudinally slidable sleeve 21. The gear 17 is mounted on this sleeve 21; and the gear 18 is mounted on this sleeve 21 and on a second co-axial sleeve 22, which surrounds the sleeve 21 and is longitudinally slidable separately from the sleeve 21. The sleeves 21 and 22 also have roller-bearing mountings in the frame 10 and cage 11 respectively, at the opposite axial end from the shaft 20, thus furnishing a support for that end of the cage 11.

The sleeve 22 at its outer end has an external gear 23, which is larger than the gear 16 and which when the sleeve 22 is in its intermediate position (shown) or in its right-hand position meshes with a pinion 24 on a shaft 25, which is eccentrically mounted in the frame 10 and is the driving shaft when the gearing is used for speed reduction. It is possible, of course, to reverse the direction of power transmission, and use the shaft 20 as the driving shaft and the shaft 25 as the driven shaft, which makes it a speed-increasing gearing; but ordinarily the gearing is used for speed reduction. The pinion 24 on the driving shaft 25 also meshes with an internal gear 26 on the cage 11, so that when the shaft 25 is rotated the cage 11 is always rotated in the same direction but at much slower speed.

When the sleeve 22 is moved to its left-hand position it is disengaged from the pinion 24, but clutch teeth 27 on its face are intermeshed with clutch teeth 28 on the inside face of the frame 10 to hold such sleeve stationary. The sleeve 21 when in the intermediate position shown is disconnected from everything. When it is moved to the right, clutch teeth 29 on a disk 30 at its outer end are intermeshed with clutch teeth 31 on the outer face of the frame 10, to hold such sleeve stationary. When it is moved to the left, clutch teeth 32 on such sleeve intermesh with clutch teeth 33 on the sleeve 22 to lock the two sleeves together, if the sleeve 22 is then in its intermediate position shown, so that under such conditions the sleeve 21 is rotated in the opposite direction from the shaft 25; the sleeve 22 is so rotated when it is in either its intermediate or its right-hand position. Suitable shifting levers 34 and 35 are provided for shifting the sleeves 21 and 22 respectively, these shift levers being provided with the usual forks which coöperate with grooves in the outer ends of such sleeves.

At or near their inner ends, in the planes of the gears 17 and 18 respectively, the shafts 21 and 22 are provided with clutch gears (or other clutch members) 37 and 38 respectively, which when their respective sleeves are in their intermediate positions are free from their associated gears 17 and 18 respectively. When the sleeve 21 is moved to either extreme position the clutching gear 37 thereon is moved into engagement with one or the other of two internal clutching gears 39 on the inside of the gear 17 to clutch the latter to the sleeve 21, and so to hold it stationary when the sleeve 21 is shifted to the right and to cause it to rotate with the sleeve 22 (if the latter is in intermediate position) when the sleeve 21 is shifted to the left. When the sleeve 22 is moved to either extreme position the clutching gear 38 thereon is moved into engagement with one or the other of two internal clutching gears 40 on the inside of the gear 18 to clutch the latter to the sleeve 22, and so to hold it stationary when the sleeve 22 is shifted to the left and to cause it to rotate with the sleeve 22 when the latter is shifted to the right.

In operation, when the shaft 25 is driven the cage 11 is always driven in the same direction but at much slower speed. With the parts in the position shown the sleeve 22 is driven in the opposite direction, but the rotation of such sleeve is then merely an idle one, and if the shaft 20 is connected to a load it and the gear 16 remain at rest, the gears 17 and 18 also moving idly. It is now possible to get four different movements, by moving either arm 34 or 35 and its associated sleeve 21 or 22 to either extreme position. Three of these are movements in the same direction at different speeds, and the fourth is in the reverse direction. The low speed forward and the reverse movements are obtained by shifting the arm 34 and sleeve 21 to their extreme positions. When such sleeve is shifted to the right, the teeth 29 and 31 and the teeth 37 and 39 interlock to hold such sleeve and the gear 17 stationary. As the cage 11 is now rotated, it carries the planetary shaft (or shafts) 12 with it, and the planetary pinions 13 and 14 roll on the gears 17 and 16; but because the pinion 13 is smaller than the pinion 14, and the gear 17 is held stationary, the gear 16 and driven shaft 20 are carried along in the same direction as the cage 11 is rotating but at a much lower speed. On the other hand, when the sleeve 21 is shifted to the left, the teeth 32 and 33 and the teeth 37 and 39 interlock (the sleeve 22 being still in intermediate position) to cause the sleeve 21 and gear 17 to rotate with the sleeve 22 and the gear 23 in the opposite direction from the rotation of the cage 11 and at a somewhat greater speed. The rotation of the cage 11 carries the shaft 12 around in the same way as before, so far as its planetary movement is concerned; but by reason of the various gear ratios used the shaft 12 is now rotated on its axis at a considerably greater speed than before, and by reason of such faster rotation drives the gear 16 and driven shaft 20 in the reverse direction.

The two higher forward speeds are obtained by shifting the arm 35 and sleeve 22 to their two extreme positions. When such sleeve 22 is shifted by its arm 35 to the left, the teeth 27 and 28 and teeth 38 and 40 are interlocked, (the gear 23 then being out of mesh with the pinion 24,) so that such sleeve 22 and the gear 18 are held stationary. As the device operates, the shaft 12 has the same planetary motion as before, and the pinion 15 rolls on the gear 18 and the pinion 13 on the gear 16; but because of the greater difference in size between the pinions 13 and 15 than between the pinions 13 and 14, this causes the gear 16 and shaft 20 to be rotated in the same manner as when the gear 17 was held stationary but at a higher speed—this is the highest speed of the shaft 20. On the other hand, when the sleeve 22 is shifted to the right, so that the gear 23 meshes with the pinion 24 and the teeth 38 interlock with the right-hand teeth 40, the gear 18 is rotated with the sleeve 22 and gear 23 in the reverse direction from the cage 11 and at a higher speed. This adds to the rolling motion of the pinion 15, just described as occuring when the gear 18 is stationary, a forward movement about its axis in the same direction as the rolling movement, so that the gear 16 and shaft 20 are not moved forward at so rapid a speed as before, though they are still moved in the forward direction—this is the intermediate forward speed.

It is possible to choose a gear ratio between the gears 17 or 18 and its associated planetary pinion which when such gear is locked to the gear 23 and thus rotated in the reverse direction from the cage 11 will superpose upon the rolling movement of the shaft 12 just enough additional movement to hold the gear 16 and shaft 20 stationary. The gear ratio between the pinion 14 and gear 17 is chosen to be on one side of such ratio, and the gear ratio between the pinion 15 and the gear 18 to be on the other side thereof.

I claim as my invention:

1. In a transmission gearing, the combination of a rotatably mounted cage, a gear co-axial with said cage and connected to a driven shaft, a planetary pinion carried by said cage and meshing with said first-named gear, a second gear also co-axial with said cage and of different size from the first, a second planetary pinion connected to the first pinion to rotate therewith and meshing with said second gear, a driving member for driving said cage in one direction, and means for locking said second gear stationary or connecting it to said driving member so that it is driven in the direction opposite that of said cage and at greater speed as desired.

2. In a transmission gearing, the combination of a rotatably mounted cage, a gear co-axial with said cage and connected to a driven shaft, a planetary pinion carried by said cage and meshing with said first-named gear, a second gear also co-axial with said cage, a second planetary pinion connected to the first pinion to rotate therewith and meshing with said second gear, a driving member for driving said cage in one direction, and means for locking said second gear stationary or connecting it to said driving member so that it is driven in the direction opposite that of said cage and at greater speed as desired.

3. In a transmission gearing, the combination of a rotatably mounted cage, a gear co-axial with said cage and connected to a driven shaft, a planetary pinion carried by said cage and meshing with said first-named gear, a second gear also co-axial with said cage and of different size from the first, a second planetary pinion connected to the first pinion to rotate therewith and meshing with said second gear, a driving member for driving said cage in one direction, and means for locking said second gear stationary or connecting it to said driving member so that it is driven in the direction opposite that of said cage as desired.

4. In a transmission gearing, the combination of a rotatably mounted cage, a gear co-axial with said cage and connected to a driven shaft, a planetary pinion carried by said cage and meshing with said first-named gear, a second gear also co-axial with said cage, a second planetary pinion connected to the first pinion to rotate therewith and meshing with said second gear, a driving member for driving said cage in one direction, and means for locking said second gear stationary or connecting it to said driving member so that it is driven in the direction opposite that of said cage as desired.

5. In a transmission gearing, the combination of a rotatably mounted cage, a gear co-axial with said cage and connected to a driven shaft, a planetary pinion carried by said cage and meshing with said first-named gear, a second gear also co-axial with said cage, and of different size from the first, a second planetary pinion connected to the first pinion to rotate therewith and meshing with said second gear, a driving pinion, said cage having a gear meshing with said driving pinion, and a gear-carrying sleeve shiftable into interlocking relation with a stationary member or into position to intermesh its gear with said driving pinion, said sleeve when in either of said positions being arranged to interlock with said second gear.

6. In a transmission gearing, the combination of a rotatably mounted cage, a gear co-axial with said cage and connected to a driven shaft, a planetary pinion carried by said cage and meshing with said first-named gear, a second gear also co-axial with said cage, a second planetary pinion connected to the first pinion to rotate therewith and meshing with said second gear, a driving pinion, said cage having a gear meshing with said driving pinion, and a gear-carrying sleeve shiftable into interlocking relation with a stationary member or into position to intermesh its gear with said driving pinion, said sleeve when in either of said positions being arranged to interlock with said second gear.

7. In a transmission gearing, the combination of a rotatably mounted cage, a gear co-axial with said cage and connected to a driven shaft, a planetary pinion carried by said cage and meshing with said first-named gear, a second gear also co-axial with said cage, a second planetary pinion connected to the first pinion to rotate therewith and meshing with said second gear, a driving pinion, said cage having a gear meshing with said driving pinion, and a gear-carrying sleeve shiftable into interlocking relation with a stationary member or into position to intermesh its gear with said driving pinion, said sleeve when in either of said positions being arranged to interlock with said second gear, the gear on said cage being an internal gear and the gear on said sleeve being an external gear of smaller diameter than said internal gear.

8. In a transmission mechanism, the combination of a rotatably mounted cage, a plurality of inter-connected planetary pinions of different diameters mounted in said cage, a plurality of gears co-axial with said cage and meshing with said pinions, a power-transmitting member connected to one of said gears, a second power-transmitting member geared to said cage, and a selective connecting mechanism for connecting any of the other gears to said second power-transmitting member or locking any of such other gears stationary.

9. In a transmission mechanism, the combination of a rotatably mounted cage, a plurality of inter-connected planetary pinions of different diameters mounted in said cage, a plurality of gears co-axial with said cage and meshing with said pinions, a power-transmitting member connected to one of said gears, a second power-transmitting member geared to said cage, and a selective connecting mechanism for connecting any of the other gears to said second power-transmitting member or locking any of such other gears stationary, said gearing between said second power-transmitting member and said cage being by a pinion on the former and an internal gear on the latter, and the connection between said power-transmitting member and said other gears being through a pinion and an external gear.

10. In a transmission mechanism, the combination of a rotatably mounted cage, a plurality of inter-connected planetary pinions of different diameters mounted in said cage, a plurality of gears co-axial with said cage and meshing with said pinions, a power-transmitting member connected to one of said gears, a second power-transmitting member geared to said cage, and a plurality of longitudinally slidable members co-axial with said cage and associated with the respective other gears, one of said longitudinally slidable members being provided with a gear which by the sliding of said member may be moved into and out of geared connection with said second power-transmitting member, and said longitudinally slidable members being arranged so that by their operation any of said other gears may be locked stationary or locked to the gear carried by one of said members while such gear is in mesh with said second power-transmitting member.

11. In a transmission mechanism, the combination of a rotatably mounted cage, a plurality of inter-connected planetary pinions of different diameters mounted in said cage, a plurality of gears co-axial with said cage and meshing with said pinions, a power-transmitting member connected to one of said gears, a second power-transmitting member geared to said cage, a gear which may be interconnected to said second power-transmitting member, and a plurality of longitudinally slidable members associated with the others of said plurality of gears and arranged by their longitudinal shifting to lock any of said other gears stationary or to said gear which is connected to said second power-transmitting member.

In witness whereof, I have hereunto set my hand at Indianapolis, Indiana, this 3rd day of January, A. D. one thousand nine hundred and twenty.

EDWARD F. KERKHOFF.